US 6,569,372 B1

(12) United States Patent
Saito et al.

(10) Patent No.: US 6,569,372 B1
(45) Date of Patent: May 27, 2003

(54) FUEL CELL SEPARATOR PRODUCTION SYSTEM AND METHOD, AND FUEL CELL SEPARATOR

(75) Inventors: Kazuo Saito, Chiba (JP); Atsushi Hagiwara, Chiba (JP); Atsushi Tsuruya, Chiba (JP); Yoshitaka Araki, Chiba (JP); Takashi Maki, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/649,441

(22) Filed: Aug. 25, 2000

(30) Foreign Application Priority Data

Aug. 27, 1999 (JP) .............................. 11-241507

(51) Int. Cl.[7] .................... B25C 43/00; B29C 33/22
(52) U.S. Cl. .................. 264/325; 425/116; 425/125; 425/236; 425/556
(58) Field of Search ............................. 429/34, 35, 36, 429/37, 38, 39; 425/556, 116, 117, 125, 236; 264/319, 335; 428/182

(56) References Cited

U.S. PATENT DOCUMENTS

| | | | | |
|---|---|---|---|---|
| 4,317,864 A | * | 3/1982 | Strasser ........................ 429/38 |
| 4,755,117 A | * | 7/1988 | Onnenberg et al. ...... 425/117 X |
| 4,824,739 A | * | 4/1989 | Breault et al. ............. 429/35 X |
| 5,234,328 A | * | 8/1993 | Willson et al. .......... 425/556 X |
| 5,409,759 A | * | 4/1995 | Kondo et al. ................ 428/182 |
| 5,667,875 A | * | 9/1997 | Usui ............................ 428/182 |
| 5,709,833 A | * | 1/1998 | Simone ................... 425/556 X |
| 5,728,333 A | * | 3/1998 | Tabata et al. ........... 264/335 X |
| 5,935,495 A | * | 8/1999 | Turner et al. ............ 264/335 X |
| 5,935,511 A | * | 8/1999 | Brown .................... 264/335 X |

* cited by examiner

*Primary Examiner*—Stephen Kalafut
(74) *Attorney, Agent, or Firm*—Muramatsu & Associates

(57) ABSTRACT

A system and method for producing fuel cell separators can produce fuel cell separators with high contact performance. The fuel cell separator production system includes an upper mold which has a pattern corresponding to a pattern of gas passages for one surface of a fuel cell separator, a lower mold which has a pattern corresponding to a pattern of gas passages for other surface of the fuel cell separator, one or more nozzles which spray a gas on the periphery of the fuel cell separator on the lower mold, and a suction device which horizontally advances and retracts in a space between the upper mold and the lower mold and removes the fuel cell separator from the lower mold. The nozzles and the suction device are formed independently from the upper mold and the lower mold.

7 Claims, 6 Drawing Sheets

FUEL CELL SEPARATOR PRODUCTION SYSTEM AND METHOD, AND FUEL CELL SEPARATOR

FIELD OF THE INVENTION

This invention relates to a production system for a fuel cell separator and a method of producing a fuel cell separator, and more particularly, to a system and method for producing a fuel cell separator wherein no ejector pins are used for lifting out a fuel cell separator from a mold, thereby being able to avoid forming ejector pin scars on the fuel cell separator, and to take out the fuel cell separator without giving any damage for the fuel cell separator.

BACKGROUND OF THE INVENTION

A fuel cell which generates electric power by making use of fuel gas and oxidant gas, especially a solid polymer type fuel cell, is considered to be a new clean energy source in various applications including automobiles. A solid polymer fuel cell is configured in such a way that an ion conductive solid electrolyte membrane is sandwiched by an anode and a cathode each having a catalyst and functions as a gas diffusion electrode, and an outside of each electrode is further provided with a separator. The separator at the anode provides hydrogen as fuel gas, and the separator at the cathode provides oxygen as oxidizer gas, respectively, to the corresponding electrodes.

Figure 3A:
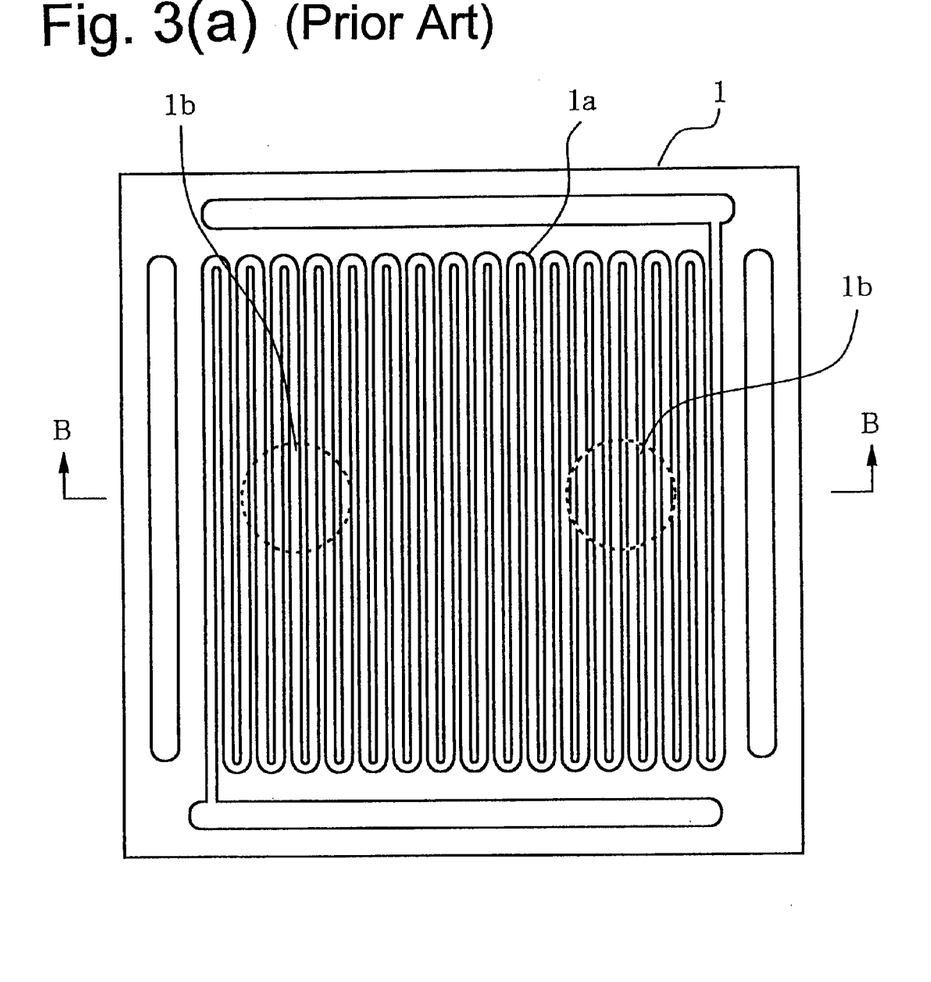
FIG. 3(a) is a plan view showing an example of a fuel cell separator.
Figure 3B:
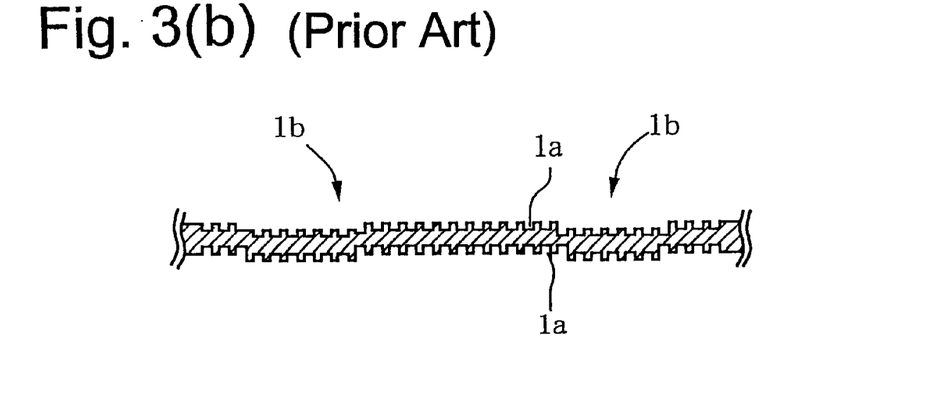
FIG. 3(b) is a cross sectional view taken along the line B—B of FIG. 3(a).

FIGS. 3(a) and 3(b) show an example of such a fuel cell separator. As shown in FIGS. 3(a) and 3(b), on a fuel cell separator 1, narrow grooves 1a are formed on a planar surface thereof. In order to increase an overall surface area for contacting between the gas diffusion electrode and the gas, the grooves 1a are meandering with a small pitch throughout the whole surface of the fuel cell separator. The grooves 1a may be formed on both surfaces of the fuel cell separator as shown in FIG. 3(b), or may be formed only on one surface of the fuel cell separator.

There are other types of structure of the fuel cell separator wherein both surfaces or one surface thereof is provided with a large number of projections where spaces between those projections are used as passages of the gas, or both surfaces or one surface thereof is provided with combinations of such projections and grooves.

In the fuel cell separator described above, the following characteristics are required.

(1) Gas non-permeability. This is a characteristic not to allow the hydrogen gas and/or oxygen gas supplied thereto to permeate through the fuel cell separator. Generally, a fuel cell is formed of many cell units stacked together where each cell unit includes a solid polymer electrolyte membrane at the center, gas diffusion electrodes at both outer sides of the electrolyte membrane, and the fuel cell separators further outside of both electrodes. The gas is flowing at least one side of the fuel cell separator. Therefore, if the fuel cell separator has gas permeability or gas leakage, an overall efficiency of power generation by the fuel cell will be decreased, or even the power generation itself cannot be performed.

(2) Electric conductivity. Because the fuel cell separator also acts as an electrode of the fuel cell, electric conductivity is an essential requirement.

(3) High surface accuracy or thickness accuracy. Because electric current flows through the contact area between the separator and the anode or cathode, insufficient surface accuracy, i.e, profile irregularity, deteriorates electric conductivity due to the insufficient contact area. Moreover, when the surface accuracy is insufficient, gaps may be formed between the anode and the cathode, which may cause breakage of the fuel cell separator when a force is applied to the separator in such a direction to press the gaps. When the surface accuracy is high, the contact resistance is small, resulting in the improvement in the fuel cell In order to satisfy the requirements noted above, an example of conventional technology involves a mold process in which powder material is formed by mixing carbon powder and synthesis resin powder. The resultant powder material is supplied to a lower mold which is then covered by an upper mold of the press machine. The separator is formed by pressing the powder material by the press machine in the high temperature condition. Within the context of this specification, the term "powder material" is used as a generic term including material in the forms of powder, grain, and short fiber.

Figure 4A:
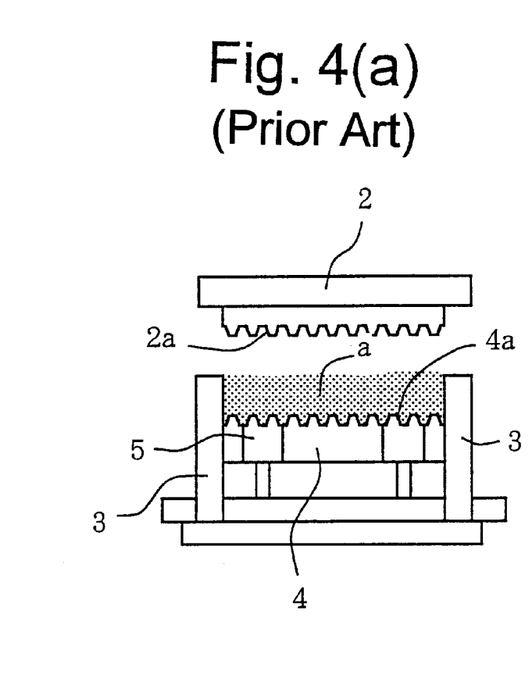
FIGS. 4(a)–4(c) are schematic diagrams showing a process in an example of conventional method for producing a fuel cell separator.
Figure 4B:
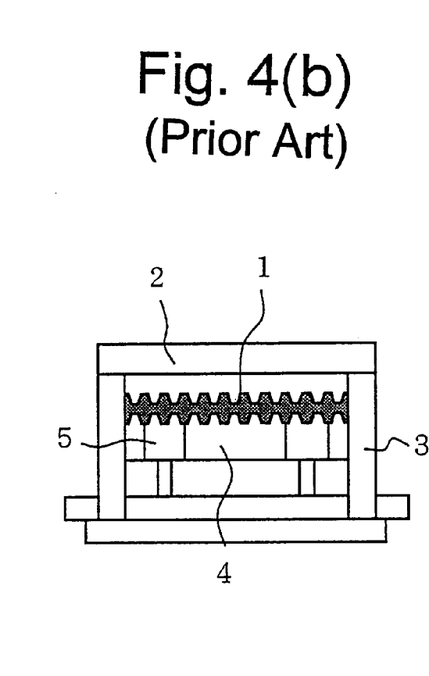
Figure 4C:
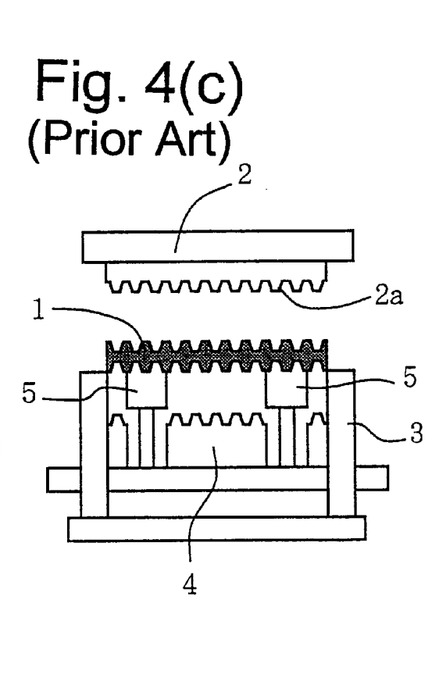

FIGS. 4(a)–4(c) further explain a production system for producing fuel cell separators using the mold technology. FIGS. 4(a)–4(c) show an upper mold 2, a mold frame 3 and a lower mold 4. As shown in FIG. 4(a), powder material a for a fuel cell separator is supplied to the lower mold 4 after separating the upper mold and the lower mold from one another. Then, as shown in FIG. 4(b), the upper mold 2 covers the lower mold 4 and applies pressure and heat to the powder material a to form the fuel cell separator 1.

After the molding is completed, as shown in FIG. 4(c), the upper mold 3 is lifted, and ejector pins 5 provided in the lower mold 4 move upward so as to separate the fuel cell separator 1 from the lower mold 4 until the position where the separator 1 can be retrieved.

A pattern 2a for an upper surface of the fuel cell separator 1 is provided on the upper mold 2. The pattern 2a is primarily gas passages to supply gas to a gas diffusion electrode of a fuel cell. An upper surface of the lower mold 4 has a pattern 4a for a lower surface of the fuel cell separator 1 to be used as gas passages.

While the pattern 2a of the upper mold is the same pattern formed on the fuel cell separator, the pattern 4a of the lower mold is a pattern different from that formed on the fuel cell separator 1. This is because ejector pins 5 are provided in the lower mold 4.

Figure 5:
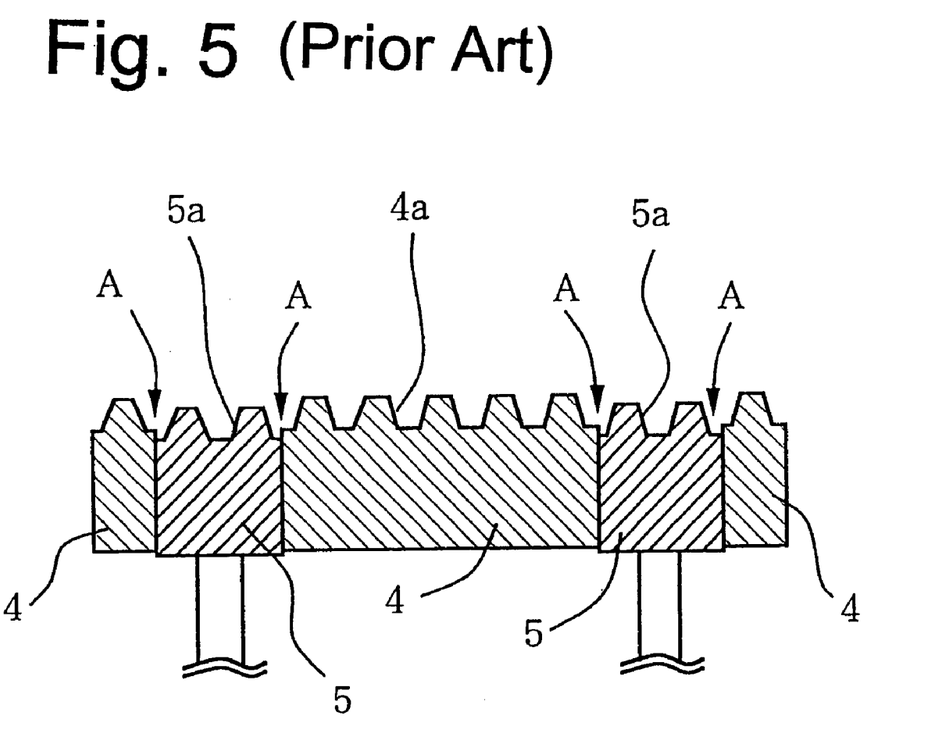
FIG. 5 is an enlarged view showing a lower mold of FIGS. 4(a)–4(c)

FIG. 5 shows an enlarged cross sectional view of the lower mold 4. On the upper surfaces of the ejector pins 5, patterns 5a are formed which are designed to be continuous to the pattern 4a. The pattern 4a and the pattern 5a are formed of concave and convex corresponding to the required pattern on the lower surface of the fuel cell separator 1. Thus, the lower mold 4 and the ejector pins 5 must be carefully prepared to avoid any level differences at boundary areas A where both members slidably contact with each other. If level differences exist, such differences are transferred to the fuel cell separator 1. The irregularity, i.e., level difference, of the fuel cell separator adversely affects a contact performance with a gas diffusion electrode, resulting in insufficient performance of the fuel cell.

However, in the configuration where ejector pins 5 are employed in the lower mold, it is practically difficult to precisely match the levels of the mold and ejector pins in the order of 0.01 mm. Consequently, on the fuel cell separator, a level difference of about 0.2 mm may be formed in the boundary areas A as ejector pin scars 1b as shown in FIGS. 3(a) and 3(b). Moreover, on the fuel cell separator 1, at the positions corresponding to the boundary areas of the ejector pins 5 and the lower mold 4, mold burrs or fins may be formed, which may obstruct the gas passages on the fuel cell separator 1. Furthermore, there is also a problem in that rigidity of the lower mold 4 is decreased because of the ejector pins.

Figure 6A:
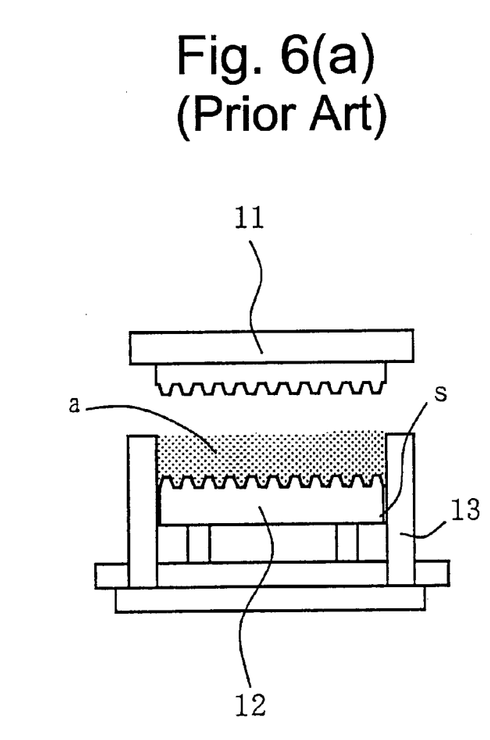
FIGS. 6(a)–6(c) are schematic diagrams showing a process in another example of conventional method for producing a fuel cell separator.
Figure 6B:
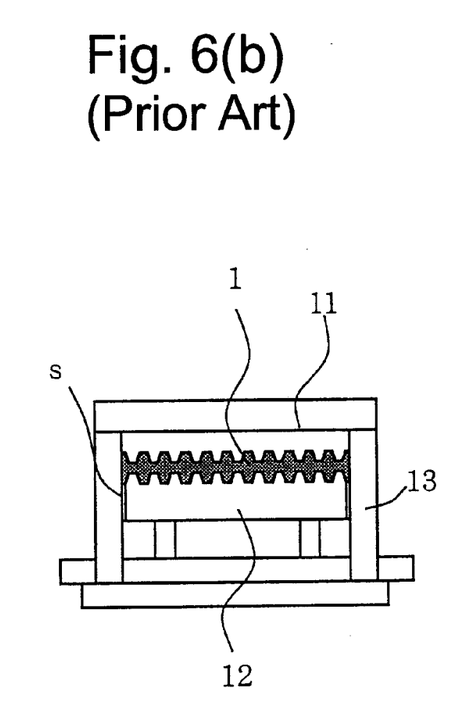
Figure 6C:
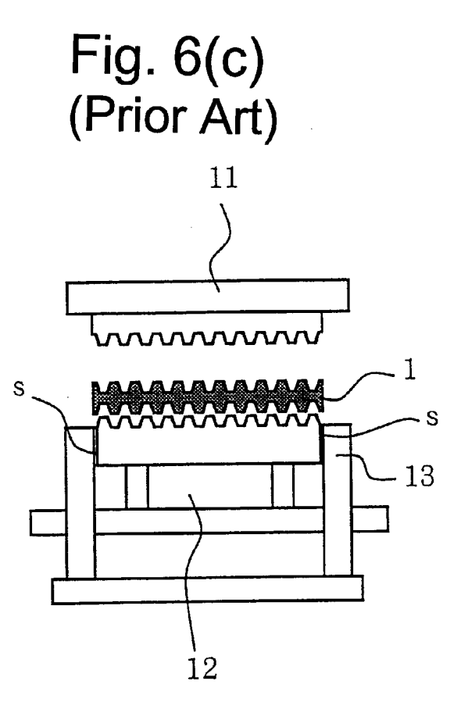

In order to solve the aforementioned problems, the production system shown in FIGS. 6(a)–6(c) has been proposed. In this system, ejector pins are not provided in the lower mold. As shown in FIG. 6(a), by separating an upper mold 11 from a lower mold 12, the powder material a is supplied to the lower mold 12. Then, the upper mold 11 covers the lower mold 11 and applies heat and pressure to the powder material a for molding. After completing the mold process, the upper mold 11 is separated from the lower mold. The foregoing process is the same as that of the previous example shown in FIGS. 4(a) and 4(b). In this prior art, however, the fuel cell separator 1 is removed by further lifting the lower mold 12 so that the fuel cell separator 1 is retrieved when the separator is raised higher than the mold frame 13.

In this prior art example, since the ejector pins are not used, ejector pin scars are no longer formed on the fuel cell separator 1. However, since the lower mold 12 has to be lifted along the mold frame 13, a gap s is formed between the lower mold 12 and the mold frame 13. Thus, the melted material may drop in the gap s and obstruct the up/down movement of the lower mold 12. Hence, clean-up is frequently required to remove the debris in the gap, which requires additional works. Such clean-up works also result in frequent stops of the press machine, thereby decreasing the production efficiency. Further, when the up/down movement of the lower mold 12 is severely hampered, the mold may be inclined or may no longer be movable due to clinging.

SUMMARY OF THE INVENTION

The present invention has been made to solve the problems encountered in the conventional technologies described above. It is, therefore, an object of the present invention to provide a fuel cell separator production system and a production method thereof which are able to produce a fuel cell separator having no ejector pin scars.

It is another object of the present invention to provide a fuel cell production system and a fuel cell production method which require no additional works and is able to achieve a high production efficiency, and to take out the molded fuel cell separator without giving any damages to the fuel cell separator.

In order to achieve the aforementioned objectives, the production system of the fuel cell separator of the present invention is characterized as having an upper mold which has a pattern formed of concave and convex corresponding to one surface of a fuel cell separator, a lower mold which has a pattern formed of concave and convex corresponding to other surface of the fuel cell separator, a suction device which horizontally advances and retracts in a space between the upper mold and the lower mold, and one or more nozzles which spray a gas on the periphery of the pattern formed on the fuel cell separator on the lower mold. The mold in the production system does not include any ejector pins, thus, the patterns formed on the upper and lower molds are the same patterns to be formed on the corresponding surfaces of the fuel cell separator.

Preferably, the lower mold may include an opening for receiving powder material for forming the fuel cell separator. Further, it is preferable that the suction device is configured to move in the vertical direction between the upper mold and the lower mold as well as in the horizontal direction to and from the space between the upper mold and the lower mold.

In the fuel cell separator production method of the present invention where the fuel cell separator is formed by supplying powder material between the upper mold and the lower mold and pressing and heating the powder, material, the method further includes the steps of separating the upper mold and the lower mold from each other, spraying the gas on the periphery of the molded fuel cell separator on the lower mold, and releasing the fuel cell separator from the lower mold, and inserting the suction device between the upper mold and the lower mold, and taking out the fuel cell separator from the lower mold by the suction force of the suction device.

The fuel cell separator of the present invention produced through the aforementioned system and method has gas passages on one or both surfaces thereof on which no ejector pin scars are formed, thereby achieving a high contact performance with the gas diffusion electrode.

DETAILED DESCRIPTION OF THE PREFERRED EMBODIMENTS

Figure 1:
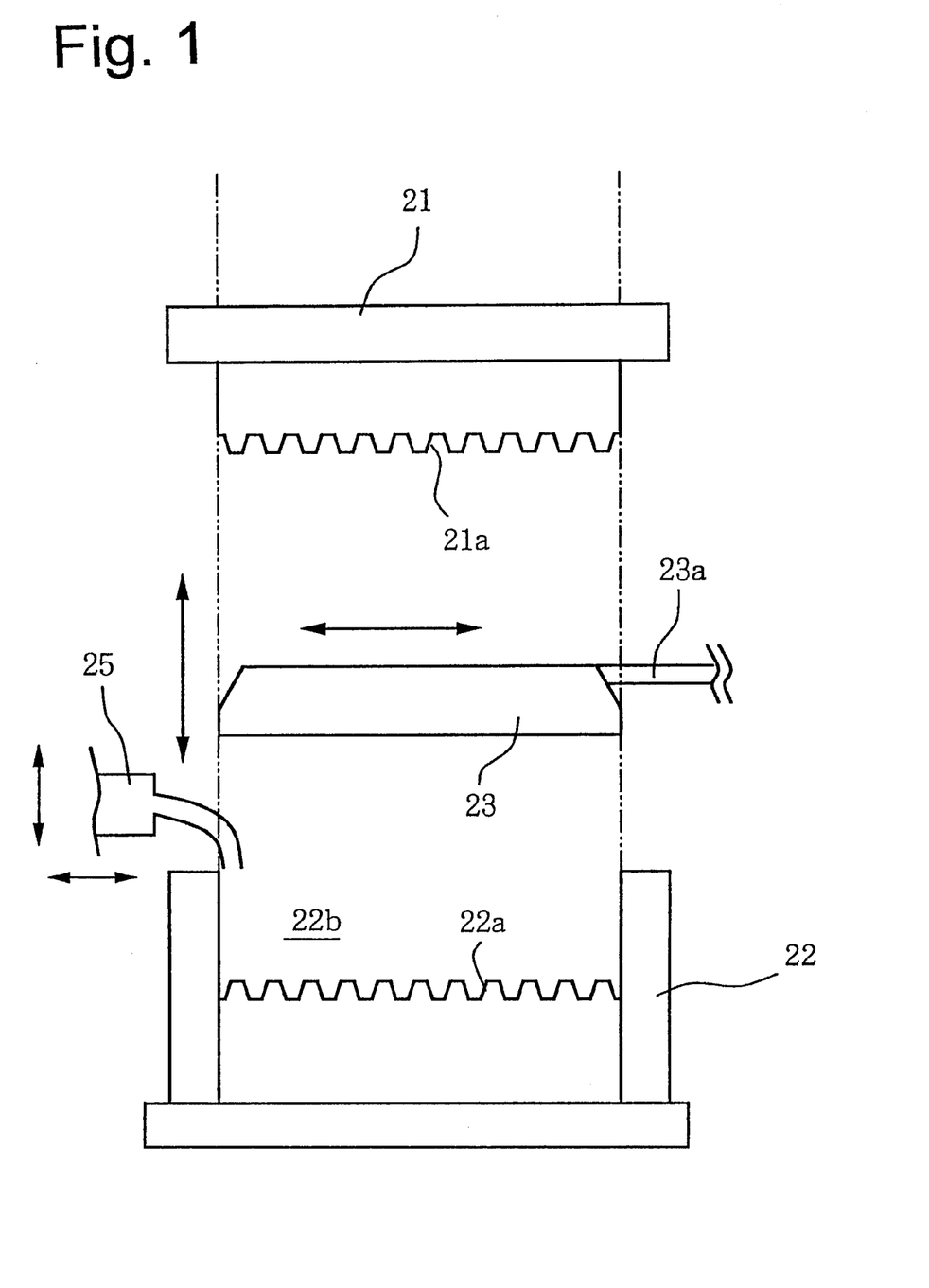
FIG. 1 is a schematic diagram showing essential components of the production system of the present invention for producing fuel cell separators.

The embodiment of the present invention will be explained in detail with reference to the accompanying drawings. FIG. 1 shows essential components of the fuel cell separator production system of the present invention. The system of the present invention shown in FIG. 1 is primarily a mold to be used in a press machine.

An upper mold 21 is identical to the upper mold described with reference to FIGS. 4 and 6 in the prior art technology. A pattern 21a formed of concave and convex to form channels (mainly gas passages and coolant passages) on the upper surface of the fuel cell separator is formed at the lower surface of the upper mold 21. A lower mold 22 constituted in such a form where the mold frame in the prior art and the lower mold are integrally combined. The lower mold 22 has a pattern 22a formed of concave and convex to form channels (mainly gas passages and coolant passages) on the lower surface of the fuel cell separator 1.

In this embodiment, the ejector pins are not present in either of the upper mold 21 or the lower mold 22. Hence, the patterns 21a and 22a are formed on the whole surface of each side of the fuel cell separator 1. Accordingly, the procedure to match the boundary areas as required in the conventional technology is no longer necessary. Further, a space 22b for receiving mold material is formed by the lower mold which is integrally formed with the mold frame. In this configuration, because the gap s causing various problems in the conventional technology of FIG. 6 no longer exists, thereby eliminating the problems that the melted material will fall in the gap. Moreover, since the lower mold 22 obviates the ejector pins and constitutes integrally with the mold frame, the durability of the mold is improved.

In this invention, a suction device 23, and one or more nozzles 25 are provided in addition to the upper mold 21 and the lower mold 22. The suction device 23 is formed separately from the upper mold 21 or the lower mold 22 and is supported by, for example, the press machine, and is moveable horizontally and vertically by a drive mechanism (not shown) Although not shown, several suction holes are provided on the lower surface of the suction device 23. By connecting a pipe 23a to a suction pump (not shown) such as a vacuum pump, the suction device 23 attracts the fuel cell separator 1 under its surface by a suction force produced by the negative force of the vacuum.

The nozzle 25 is also formed separately from the upper mold 21 or the lower mold 22 and is used for the purpose of spraying a compressed gas on the periphery of the pattern formed of concave and convex of the lower mold. For example, the compressed gas is a compressed air, nitrogen gas, carbon dioxide gas, and etc. The nozzle 25 is configured as having only one or more nozzles. In the example having two nozzles, such nozzles are positioned in opposite sides of the fuel cell separator 1. The nozzle 25 can be further configured as having four nozzles that are positioned at each of four sides of the fuel cell separator 1, or as having a continuous nozzle that exists in all the periphery of fuel cell separator 1. Preferably, the nozzle 25 is also able to move horizontally and vertically as shown in FIG. 1 by a suitable drive device (not shown).

Figure 2A:
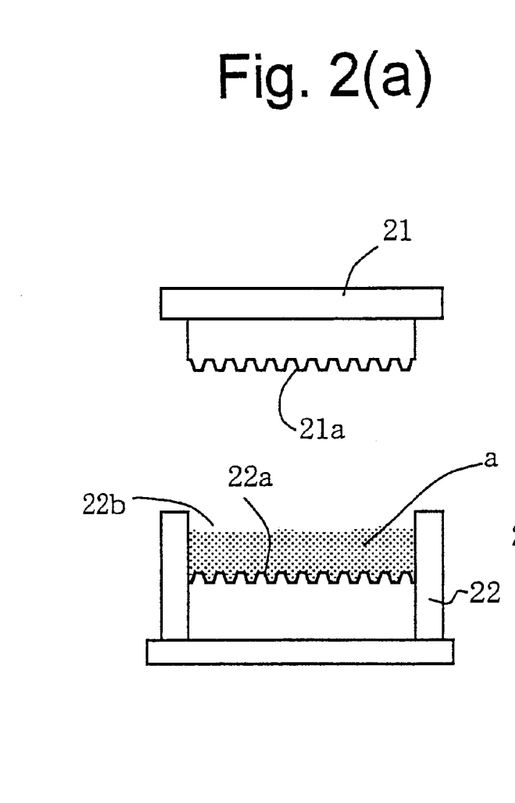
FIGS. 2(a)–2(c) are schematic diagrams showing an example of process in the method of the present invention for producing a fuel cell separator.
Figure 2B:
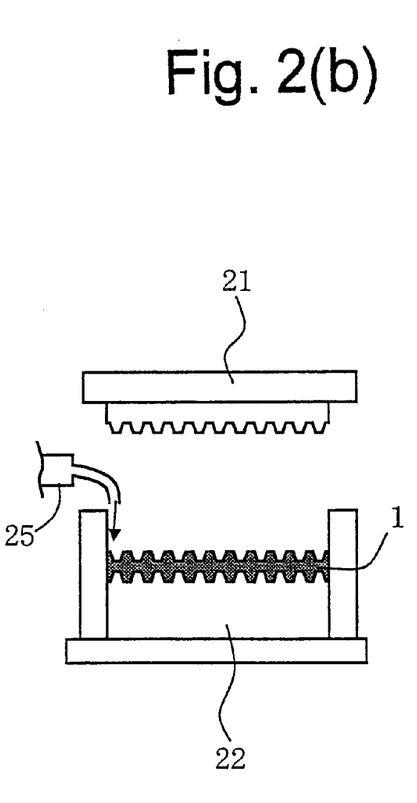
Figure 2C:
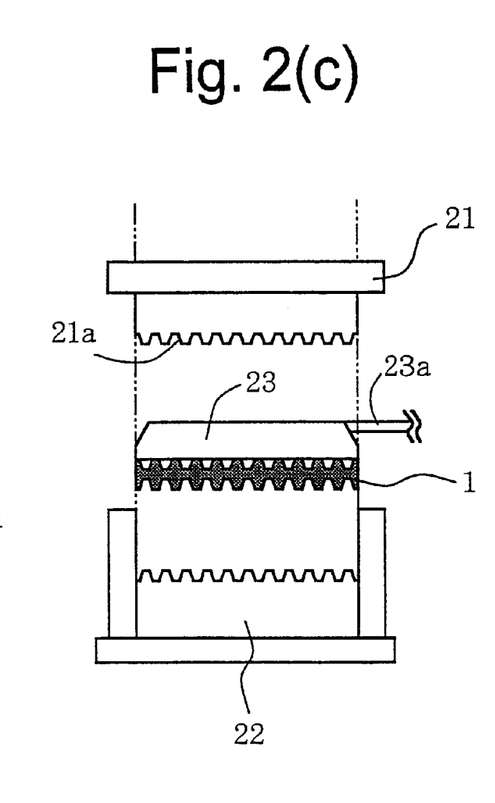

An example of process for producing the fuel cell separator by operating the production system of FIG. 1 is shown in FIGS. 2(a)–2(c).

In FIG. 2(a), the upper mold 21 and the lower mold 22 are separated from each other. The powder material a for a fuel cell separator is supplied to the space 22b formed on the lower mold. An example of powder material a for the fuel cell separator is a powdered mixture of graphite scales (average diameter: 30 $\mu$m) and phenol resin with a weight ratio of about 100:25.

When the powder material is filled in the space 22b, the upper mold 21 is placed on the lower mold 22 as shown in FIG. 2(b). The upper and lower molds are pressed by the pressure of 200 Kg/cm$^2$ under the temperature of 160° C. for about 5 minutes to form a fuel cell separator having a size of 300 mm by 250 mm with thickness of 2 mm. Then the upper mold 21 and the lower mold 22 are separated from each other as shown in FIG. 2(b), and the nozzle 25 is moved to the periphery of the lower mold 22, and the compressed gas (for example a compressed air, etc.) is sprayed on the periphery of the fuel cell separator 1 on the lower mold 22. The sprayed gas passes between the lower mold and the fuel cell separator 1 and releases the fuel cell separator from the lower mold 22. Though the fuel cell separator 1 is very thin and very brittle, because of the sprayed gas, it is safely taken out from the lower mold 22 without giving any damages.

Then, in FIG. 2(c), the upper mold 21 and the lower mold 22 are separated again. Between the upper mold 21 and the lower mold 22, the suction device 23 is horizontally moved in until about the center thereof over the lower mold 22. The suction device 23 is lowered to lightly contact the fuel cell separator 1 for picking the fuel cell separator 1 by the suction force. Preferably, the size of the suction device 23 is slightly smaller than that of the separator 1, such as 290 mm by 249 mm.

By activating the suction force, the fuel cell separator 1 is adhered to the suction device 23. Further, by the upward movement of the suction device 23, the fuel cell separator 1 is separated from the lower mold 22. In this manner, the suction device 23 picks the fuel cell separator 1, horizontally transfers the separator 1 to an unload area (not shown), lowers the separator 1 if necessary, and releases the separator 1 by reducing the suction force. Accordingly, the fuel cell separator 1 is removed from the mold without using the ejector pins and is transferred to the unload area by the suction device 23. Thus, the fuel cell separator 1 produced by the present invention does not have the ejector pin scars, resulting in no level differences.

According to the present invention described above, the fuel cell separator can be taken out from the mold by the suction device and the nozzle from which the gas is ejected, without using the ejector pins, due to the unique method and configuration of the production system.

The production system comprises the upper mold provided with the pattern formed of concave and convex corresponding to one surface of the fuel cell separator, the lower mold provided with the pattern formed of concave and convex corresponding to the other surface of the fuel cell separator, the suction device that can horizontally move back and forth between the upper mold and the lower mold, and the nozzle that is used for the purpose of spraying the compressed gas on the periphery of the pattern formed on the fuel cell separator on the lower mold. Thus, the ejector pin scars are not formed on the surface of the fuel cell separator, thereby enabling to produce fuel cell separators with high surface accuracy.

In the foregoing configuration, the nozzle is configured as having one nozzle or plural nozzles. When the nozzle is configured to have two or more nozzles, it is effective to release the fuel cell separator from the lower mold more certainly and smoothly compared to the that having only one nozzle.

Further, the suction device can be so configured to move in the vertical direction as well as in the horizontal direction between the upper mold and the lower mold. Therefore, the fuel cell separator can be securely taken out from the mold after the formation even when there is a positional difference between the suction device and the mold.

Moreover, since the fuel cell separator produced through the production system and method of the present invention has no ejector pin scars on the gas passages formed on the surface thereof, such problems as the obstruction of the gas passages experienced in the prior art no longer exist. Further, since there is no level differences caused by the ejector pin scars, the contact performance between the fuel cell separator and the gas diffusion electrode can be substantially improved and stabilized.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A production system for producing a fuel cell separator, comprising:

an upper mold which has a pattern formed of concave and convex corresponding to one surface of a fuel cell separator;

a lower mold which has a pattern formed of concave and convex corresponding to the other surface of the fuel cell separator;

a suction device which horizontally advances and retracts in a space between the upper mold and the lower mold and removes the fuel cell separator from the lower mold, said suction device being formed separately from the upper mold or the lower mold; and one or more nozzles which spray a gas on the periphery of said pattern of the fuel cell separator on said lower mold, said nozzles being formed separately from the upper mold or the lower mold.

2. A production system for producing a fuel cell separator as defined in claim 1, wherein said suction device is movable in a vertical direction between the upper mold and the lower mold.

3. A production system for producing a fuel cell separator as defined in claim 1, wherein said lower mold is integrally formed with a mold frame in such a way that no gaps are created between the lower mold and the mold frame.

4. A production system for producing a fuel cell separator as defined in claim 3, wherein said lower mold has an opening to receive mold material therein.

5. A production system for producing a fuel cell separator as defined in claim 3, wherein said suction device is provided with means for controlling a suction force to pick the fuel cell separator that has been formed between the upper mold and the lower mold, to transfer the fuel cell separator toward an area outside of the molds, and to release the fuel cell separator.

6. A production system for producing a fuel cell separator as defined in claim 3, wherein said suction device produces a suction force by using a vacuum force.

7. A method for producing a fuel cell separator, comprising the steps of:

supplying powder material between the upper mold and the lower mold;

pressing and heating the powder material between the upper mold and the lower mold;

inserting a nozzle between the upper mold and the lower mold and spraying a gas on a periphery of the molded fuel cell separator on the lower mold, thereby releasing the fuel cell separator from the lower mold, said nozzle being formed separately from the upper mold or the lower mold;

separating the upper mold and the lower mold from each other;

inserting a suction device horizontally between the upper mold and the lower mold, said suction device being formed separately from the upper mold or the lower mold; and taking out the fuel cell separator by a suction force of the suction device.

* * * * *